(12) United States Patent
Held et al.

(10) Patent No.: US 10,024,198 B2
(45) Date of Patent: Jul. 17, 2018

(54) HEAT ENGINE SYSTEM INCLUDING AN INTEGRATED COOLING CIRCUIT

(71) Applicant: Echogen Power Systems, L.L.C., Akron, OH (US)

(72) Inventors: Timothy Held, Akron, OH (US); Jason D. Miller, Hudson, OH (US)

(73) Assignee: Echogen Power Systems, LLC, Akron, OH (US)

( * ) Notice: Subject to any disclaimer, the term of this patent is extended or adjusted under 35 U.S.C. 154(b) by 0 days.

(21) Appl. No.: 15/231,047

(22) Filed: Aug. 8, 2016

(65) Prior Publication Data

US 2017/0130614 A1    May 11, 2017

Related U.S. Application Data

(60) Provisional application No. 62/204,962, filed on Aug. 13, 2015.

(51) Int. Cl.

| F01K 13/00 | (2006.01) |
|---|---|
| F01K 27/02 | (2006.01) |
| F01K 25/04 | (2006.01) |
| F01D 15/08 | (2006.01) |
| F01D 15/10 | (2006.01) |
| H02K 7/18 | (2006.01) |
| F28B 1/00 | (2006.01) |
| F28B 7/00 | (2006.01) |

(52) U.S. Cl.
CPC ............. *F01K 27/02* (2013.01); *F01D 15/08* (2013.01); *F01D 15/10* (2013.01); *F01K 13/006* (2013.01); *F01K 25/04* (2013.01); *F28B 1/00* (2013.01); *F28B 7/00* (2013.01); *H02K 7/1823* (2013.01)

(58) Field of Classification Search
CPC ........ F01D 15/08; F01D 15/10; F01K 13/006; F01K 27/02; F28B 1/00; F28B 7/00
USPC ......... 290/52, 40 C, 40 R; 60/728, 692, 651, 60/671; 62/238.4
See application file for complete search history.

(56) References Cited

U.S. PATENT DOCUMENTS

| 8,613,195 | B2 * | 12/2013 | Held | ........................ | F01K 3/185 60/645 |
|---|---|---|---|---|---|
| 8,813,497 | B2 * | 8/2014 | Hart | ........................ | F01K 3/185 60/641.1 |
| 8,869,531 | B2 * | 10/2014 | Held | ........................ | F01K 3/185 60/651 |
| 2008/0006040 | A1 * | 1/2008 | Peterson | .............. | B60H 1/3204 62/116 |
| 2011/0061384 | A1 * | 3/2011 | Held | ........................ | F01K 3/185 60/645 |

(Continued)

*Primary Examiner* — Julio C. Gonzalez

(57) ABSTRACT

A heat engine system and a method for cooling a fluid stream in thermal communication with the heat engine system are provided. The heat engine system may include a working fluid circuit configured to flow a working fluid therethrough, and a cooling circuit in fluid communication with the working fluid circuit and configured to flow the working fluid therethrough. The cooling circuit may include an evaporator in fluid communication with the working fluid circuit and configured to be in fluid communication with the fluid stream. The evaporator may be further configured to receive a second portion of the working fluid from the working fluid circuit and to transfer thermal energy from the fluid stream to the second portion of the working fluid.

7 Claims, 7 Drawing Sheets

(56) References Cited

U.S. PATENT DOCUMENTS

| | | | | |
|---|---|---|---|---|
| 2011/0296849 A1* | 12/2011 | Benson | ................... | F01K 25/10 62/6 |
| 2012/0047892 A1* | 3/2012 | Held | ....................... | F01K 3/185 60/652 |
| 2014/0041387 A1* | 2/2014 | Benson | ................... | F01K 25/10 60/655 |
| 2014/0090405 A1* | 4/2014 | Held | ........................ | F25B 1/06 62/79 |

* cited by examiner

HEAT ENGINE SYSTEM INCLUDING AN INTEGRATED COOLING CIRCUIT

CROSS-REFERENCE TO RELATED APPLICATIONS

This application claims the benefit of U.S. Prov. Appl. No. 62/204,962, filed Aug. 13, 2015. This application is incorporated herein by reference in their entirety to the extent consistent with the present application.

BACKGROUND

Waste heat is often created as a byproduct of industrial processes where flowing streams of high-temperature liquids, gases, or fluids must be exhausted into the environment or removed in some way in an effort to maintain the operating temperatures of the industrial process equipment. Some industrial processes utilize heat exchanger devices to capture and recycle waste heat back into the process via other process streams. However, the capturing and recycling of waste heat is generally infeasible by industrial processes that utilize high temperatures or have insufficient mass flow or other unfavorable conditions.

Therefore, waste heat may be converted into useful energy by a variety of turbine generator or heat engine systems that employ thermodynamic methods, such as Rankine cycles or other power cycles. Rankine and similar thermodynamic cycles are typically steam-based processes that recover and utilize waste heat to generate steam for driving a turbine, turbo, or other expander connected to an electric generator, a pump, or other device.

An organic Rankine cycle utilizes a lower boiling-point working fluid, instead of water, during a traditional Rankine cycle. Exemplary lower boiling-point working fluids include hydrocarbons, such as light hydrocarbons (e.g., propane or butane) and halogenated hydrocarbons, such as hydrochlorofluorocarbons (HCFCs) or hydrofluorocarbons (HFCs) (e.g., R245fa). More recently, in view of issues such as thermal instability, toxicity, flammability, and production cost of the lower boiling-point working fluids, some thermodynamic cycles have been modified to circulate non-hydrocarbon working fluids, such as carbon dioxide.

In addition to the use of non-hydrocarbon fluids as working fluids in Rankine cycles, non-hydrocarbon fluids have also been used as a refrigerant in cooling circuits to cool machinery and electronics. For example, carbon dioxide has been used as a refrigerant in a multitude of processes and systems based on its low cost, abundance in the environment, and harmlessness to the biosphere. Moreover, carbon dioxide is an inert product, compatible with common materials encountered in a cooling circuit.

Therefore, there is a need for a heat engine system and method capable of transforming energy, whereby the non-hydrocarbon working fluid utilized in the heat engine system and method for transforming energy is also utilized as a refrigerant in a cooling circuit integrated within the heat engine system.

SUMMARY

Embodiments of the disclosure may provide a heat engine system. The heat engine system may include a working fluid circuit configured to flow a working fluid therethrough. The working fluid circuit may include a waste heat exchanger configured to be in fluid communication and in thermal communication with a heat source stream, and to transfer thermal energy from the heat source stream to the working fluid. The working fluid circuit may also include an expander disposed downstream from and in fluid communication with the waste heat exchanger and configured to convert a pressure drop in the working fluid to mechanical energy. The working fluid circuit may further include a recuperator disposed upstream of and in fluid communication with the waste heat exchanger and disposed downstream from and in fluid communication with the expander. The working fluid circuit may also include a pump disposed upstream of and in fluid communication with the recuperator and configured to pressurize and circulate at least a first portion of the working fluid within the working fluid circuit. The working fluid circuit may further include a first condenser disposed upstream of and in fluid communication with the pump and disposed downstream from and in fluid communication with the recuperator. The heat engine system may also include a cooling circuit in fluid communication with the working fluid circuit and configured to flow the working fluid therethrough. The cooling circuit may include an evaporator in fluid communication with the working fluid circuit and configured to be in fluid communication with a fluid stream. The evaporator may be further configured to receive a second portion of the working fluid from the working fluid circuit and to transfer thermal energy from the fluid stream to the second portion of the working fluid.

Embodiments of the disclosure may further provide a heat engine system. The heat engine system may include a working fluid circuit configured to flow a working fluid therethrough. The working fluid may include carbon dioxide. The working fluid circuit may include a waste heat exchanger configured to be in fluid communication and in thermal communication with a heat source stream, and to transfer thermal energy from the heat source stream to the working fluid. The working fluid circuit may also include an expander configured to receive the working fluid from the waste heat exchanger and to convert a pressure drop in the working fluid to mechanical energy. The working fluid circuit may further include a pump configured to pressurize and circulate a least a first portion of the working fluid within the working fluid circuit. The pump may be further being configured to be driven by the expander via a driveshaft. The working fluid circuit may also include a recuperator configured to receive the working fluid from the expander and the first portion of the working fluid from the pump, and to transfer thermal energy from the working fluid received from the expander to the first portion of the working fluid received from the pump. The working fluid circuit may further include a first condenser disposed downstream from the recuperator and upstream of the pump. The heat engine system may include a cooling circuit configured to be in fluid communication with the working fluid circuit and to flow the working fluid therethrough. The cooling circuit may include an expansion valve configured to receive a second portion of the working fluid from the working fluid circuit and to reduce the pressure and temperature of the second portion of the working fluid flowing therethrough. The cooling circuit may also include an evaporator configured to be in fluid communication with a fluid stream. The evaporator may be further configured to receive the second portion of the working fluid from the expansion valve and to transfer thermal energy from the fluid stream to the second portion of the working fluid.

Embodiments of the disclosure may further provide a method for cooling a fluid stream in thermal communication with a heat engine system. The method may include transferring thermal energy from a heat source stream to a working fluid in a waste heat exchanger of a working fluid circuit of the heat engine system. The method may also include expanding the working fluid in an expander in fluid communication with the waste heat exchanger, and circulating at least a first portion of the working fluid in the working fluid circuit via a pump driven by the expander. The method may further include cooling the working fluid in a first condenser disposed upstream of the pump in the working fluid circuit, and expanding a second portion of the working fluid in a cooling circuit. The cooling circuit may be fluidly coupled with the working fluid circuit at a first junction and a second junction, and the second junction may be disposed upstream of the first condenser. The method may also include transferring thermal energy from the fluid stream to the second portion of the working fluid in an evaporator, thereby cooling the fluid stream.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
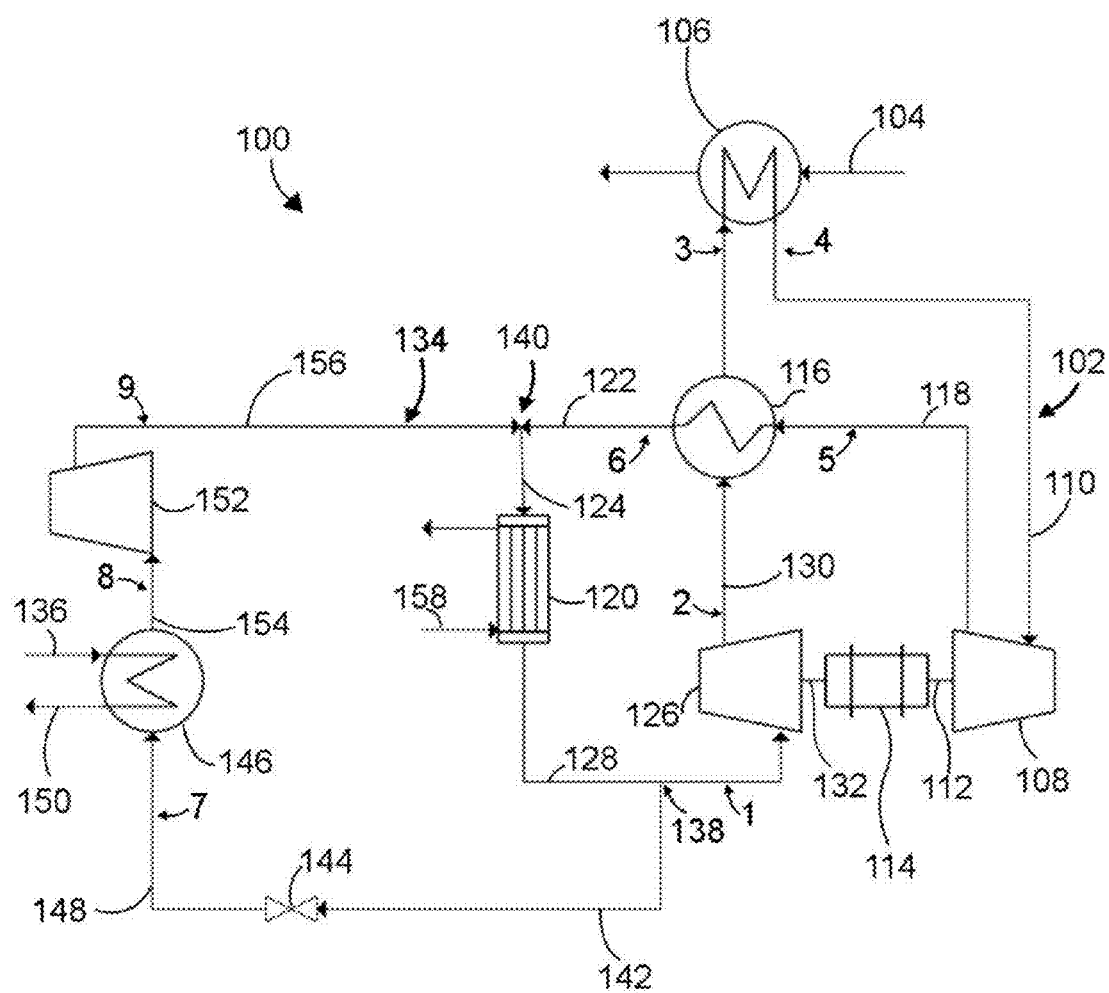
FIG. 1 illustrates a heat engine system having a working fluid circuit integrated with a cooling circuit, according to one or more embodiments disclosed herein.

It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Additionally, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. Furthermore, as it is used in the claims or specification, the term "or" is intended to encompass both exclusive and inclusive cases, i.e., "A or B" is intended to be synonymous with "at least one of A and B," unless otherwise expressly specified herein.

Embodiments of the disclosure generally provide heat engine systems and methods for transforming energy, such as generating mechanical energy and/or electrical energy from thermal energy. The heat engine systems, as described herein, are configured to efficiently convert thermal energy of a heated stream (e.g., a waste heat stream) into valuable mechanical energy and/or electrical energy. The heat engine systems may utilize the working fluid in a supercritical state (e.g., sc-CO2) contained within the working fluid circuit for capturing or otherwise absorbing thermal energy of the waste heat stream with one or more waste heat exchangers. The thermal energy may be transformed to mechanical energy by a turbine and subsequently transformed to electrical energy by a generator coupled to the turbine. The heat engine systems further contain an integrated cooling circuit utilizing the working fluid contained in the working fluid circuit for the cooling of a fluid stream provided from an external source.

Turning now to the drawings, FIG. 1 illustrates an embodiment of a heat engine system 100, which may also be referred to as a thermal engine system, a power generation system, a waste heat or other heat recovery system, and/or a thermal to electrical energy system, as described in one or more embodiments herein. The heat engine system 100 is generally configured to encompass one or more elements of a Rankine cycle, a derivative of a Rankine cycle, or another thermodynamic cycle for generating electrical energy from a wide range of thermal sources. The heat engine system 100 may include a working fluid circuit 102 containing and configured to flow therethrough a working fluid. The working fluid may be in thermal communication with a heat source stream 104 via a waste heat exchanger 106 of the working fluid circuit 102. The waste heat exchanger 106 may be in fluid communication with the heat source stream 104 and configured to transfer thermal energy from the heat source stream 104 to the working fluid flowing therethrough.

The heat source stream 104 may be a waste heat stream such as, but not limited to, gas turbine exhaust stream, industrial process exhaust stream, or other combustion product exhaust streams, such as furnace or boiler exhaust streams. Other exemplary waste heat streams may include high temperature liquid metal, molten salt, or brine streams. The heat source stream 104 may be at a temperature within a range from about 100° C. to about 1,000° C., or greater than 1,000° C., and in some examples, within a range from about 200° C. to about 800° C., more narrowly within a range from about 300° C. to about 700° C., and more narrowly within a range from about 400° C. to about 600° C., for example, within a range from about 500° C. to about 550° C. The heat source stream 104 may contain air, carbon dioxide, carbon monoxide, water or steam, nitrogen, oxygen, argon, derivatives thereof, or mixtures thereof. In some embodiments, the heat source stream 104 may derive thermal energy from renewable sources of thermal energy, such as solar or geothermal sources.

The working fluid circuit 102 may further include a turbine 108 disposed downstream from and in fluid communication with the waste heat exchanger 106 via line 110. The turbine 108 may be configured to convert a pressure drop in the working fluid to mechanical energy whereby the absorbed thermal energy of the working fluid is transformed to mechanical energy of the turbine 108. Therefore, the turbine 108 may be an expansion device capable of transforming a pressurized fluid into mechanical energy, generally, transforming high temperature and pressure fluid into mechanical energy, such as rotating a shaft 112.

The turbine 108 may contain or be an expander, or another device for receiving and expanding the working fluid discharged from the waste heat exchanger 106. The turbine 108 may have an axial construction or radial construction and may be a single-staged device or a multi-staged device. Exemplary turbines 108 include an expansion device, a geroler, a gerotor, other types of positive displacement devices such as a piston, a turbine, or any other device capable of transforming a pressure or pressure/enthalpy drop in a working fluid into mechanical energy. A variety of expanding devices are capable of working within the inventive system and achieving different performance properties that may be utilized as the turbine 108.

The turbine 108 may be generally coupled to a generator 114 by the shaft 112. A gearbox (not shown) may be generally disposed between the turbine 108 and the generator 114 and adjacent or encompassing the shaft 112. The shaft 112 may be a single piece or contain two or more pieces coupled together. In one example, a first segment of the shaft 112 extends from the turbine 108 to the gearbox, a second segment of the shaft 112 extends from the gearbox to the generator 114, and multiple gears are disposed between and coupled to the two segments of the shaft 112 within the gearbox.

The generator 114 may be a generator, an alternator (e.g., permanent magnet alternator), or other device for generating electrical energy, such as transforming mechanical energy from the shaft 112 and the turbine 108 to electrical energy. A power outlet (not shown) may be electrically coupled to the generator 114 and configured to transfer the generated electrical energy from the generator 114 to an electrical grid (not shown). The electrical grid may be or include an electrical grid, an electrical bus (e.g., plant bus), power electronics, other electric circuits, or combinations thereof. The electrical grid may generally contain at least one alternating current bus, alternating current grid, alternating current circuit, or combinations thereof. In one example, the generator 114 may be a generator and may be electrically and operably connected to the electrical grid via the power outlet. In another example, the generator 114 may be an alternator and may be electrically and operably connected to power electronics (not shown) via the power outlet. In another example, the generator 114 may be electrically connected to power electronics which may be electrically connected to the power outlet. The power electronics may be configured to convert the electrical power into desirable forms of electricity by modifying electrical properties, such as voltage, current, or frequency. The power electronics may include converters or rectifiers, inverters, transformers, regulators, controllers, switches, resisters, storage devices, and other power electronic components and devices.

The working fluid circuit 102 may further include one or more recuperators (one shown 116) disposed downstream from and in fluid communication with the turbine 108 via line 118. The recuperator 116 may be configured to remove at least a portion of thermal energy from the working fluid discharged from the turbine 108. The thermal energy removed may be utilized to heat, and thus increase the amount of thermal energy in the working fluid flowing toward the waste heat exchanger 106, which will be discussed in further detail below. In some examples, the recuperator 116 may be a heat exchanger configured to cool the low pressurized working fluid discharged or downstream from the turbine 108 while heating the high pressurized working fluid entering into or upstream of the waste heat exchanger 106.

The working fluid circuit 102 may further include a cooler or a condenser 120 disposed downstream from and in fluid communication with the recuperator 116 via lines 122 and 124. The condenser 120 may be configured to receive the cooled working fluid from the recuperator 116 and to further cool and/or condense the cooled working fluid which may be recirculated throughout the working fluid circuit 102. In many examples, the condenser 120 is a cooler and may be configured to control a temperature of the working fluid by transferring thermal energy from the working fluid to a cooling loop or system outside of the working fluid circuit 102. In an exemplary embodiment, the condenser 120 may be cooled via a cooling loop or system containing water or air.

The working fluid circuit 102 may further include a compressor or pump 126 disposed downstream from and in fluid communication with the condenser 120 via line 128. The pump 126 may be further disposed upstream of and in fluid communication with the recuperator 116 via line 130. The pump 126 may be configured to circulate the working fluid throughout the working fluid circuit 102. The pump 126 may be coupled with and driven by the turbine 108 via a drive shaft 132 and optional gearbox (not shown). In an exemplary embodiment, the drive shaft 132 and the drive shaft 112 may be integral, or single-piece, such that the pump 126, generator 114, and turbine 108 have a common shaft. The pump 126 may have an inlet for receiving at least a first portion of the working fluid from the condenser 120 via line 128, and the pump 126 has an outlet for discharging the pressurized working fluid via line 130 into the working fluid circuit 102.

As shown in FIG. 1, the heat engine system 100 may include a cooling circuit 134 fluidly coupled with the working fluid circuit 102 and configured to provide a cooling cycle for cooling a fluid stream 136 thermally coupled therewith. In an exemplary embodiment, the cooling circuit 134 may be fluidly coupled with the working fluid circuit 102 at a first junction or location 138 downstream from the condenser 120 and upstream of the pump 126 and at a second junction or location 140 upstream of the condenser 120. Accordingly, the working fluid discharged from the condenser 120 via line 128 may be split into a first portion and a second portion at the first location 138. The first portion of the working fluid discharged from the condenser 120 may flow via line 128 to the pump 126 for pressurization and circulation through the working fluid circuit 102. The second portion of the working fluid may be directed to the cooling circuit 134 at the first location 138 via line 142 to begin the cooling cycle.

In an exemplary embodiment, the cooling circuit 134 may include an expansion valve 144 downstream from and in fluid communication with the condenser 120 via lines 128 and 142 such that the second portion of the working fluid may be flowed therethrough. The expansion valve 144 may be configured to provide adiabatic expansion, resulting in a reduced pressure and temperature of the second portion of the working fluid flowing therethrough. In addition, the expansion valve 144 may be configured to control, or meter, the amount of working fluid output therefrom. Accordingly, the expansion valve 144 may be generally referred to as a metering device.

The cooling circuit 134 may further include an evaporator 146 downstream from and in fluid communication with the expansion valve 144. The evaporator 146 may further be in fluid communication with the fluid steam 136 provided by an external source (not shown). In an exemplary embodiment, the fluid stream 136 may be a process fluid for a gas turbine power plant. More particular, the fluid stream may be a process fluid, such as air or water, to be fed into a gas turbine inlet. As is generally known, power output and fuel consumption of a gas turbine power plant is dependent upon mass flow, quality, and ambient temperature of the air drawn into the combustion chamber. Accordingly, providing cooling to the process fluid to be introduced into the gas turbine power plant increases the power output of the gas turbine power plant. In another embodiment, the fluid stream 136 may be a refrigerant or other cooling fluid provided to cool electronics or other components susceptible to heat-related failure. One of ordinary skill in the art will appreciate that the application of the fluid stream 136 is not limited to the above, but may be utilized as a refrigerant or other cooling fluid in any other application in which cooling of a process, system, or component thereof is desired.

Accordingly, as shown in FIG. 1, the evaporator 146 may be configured to receive the second portion of the working fluid output from the expansion valve 144 via line 148, and the fluid stream 136 from the extremal source. The evaporator 146 may be further configured to transfer thermal energy from the fluid stream 136 to the second portion of the working fluid, thereby providing a cooled fluid stream 150 exiting the evaporator 146 and vaporizing the second portion of the working fluid. Thus, the second portion of the working fluid provided via the working fluid circuit 102 may be utilized as a refrigerant in the cooling circuit 134 fluidly coupled thereto.

The cooling circuit 134 may further include a compressor 152 disposed downstream from and in fluid communication with the evaporator 146 via line 154. The compressor 152 may be configured to receive the vaporized second portion of the working fluid discharged from the evaporator 146 and to compress the second portion of the working fluid to a higher pressure, resulting in an increased temperature, such that the compressed second portion of the working fluid may be discharged from the compressor 152 via line 156 and combined with the first portion of the working fluid from line 122 of the working fluid circuit 102 at the second location 140. The combined first portion and second portion of the working fluid may be fed to the condenser 120 via line 124, where the combined first and second portions of the working fluid may be condensed and cooled with a cooling fluid 158. In an exemplary embodiment, the cooling fluid 158 may be water or air. Upon discharge from the condenser 120, the combined working fluid is separated at the first location 138 and the cycles associated with the respective separated first and second portions may be repeated.

Figure 2:
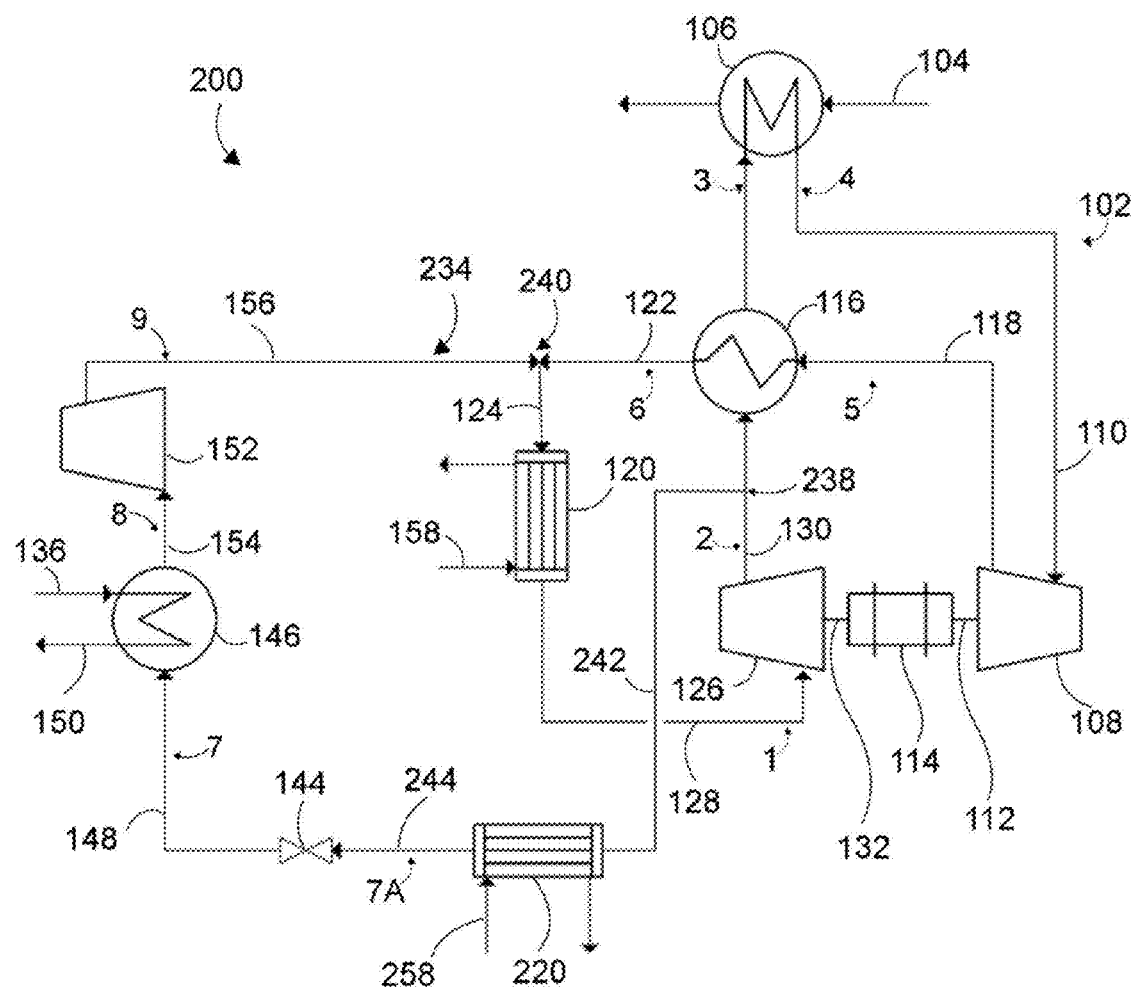
FIG. 2 illustrates another heat engine system having a working fluid circuit integrated with a cooling circuit, according to one or more embodiments disclosed herein.

FIG. 2 illustrates another embodiment of a heat engine system 200, which may also be referred to as a thermal engine system, a power generation system, a waste heat or other heat recovery system, and/or a thermal to electrical energy system, as described in one or more embodiments herein. The heat engine system 200 is generally configured to encompass one or more elements of a Rankine cycle, a derivative of a Rankine cycle, or another thermodynamic cycle for generating electrical energy from a wide range of thermal sources. The heat engine system 200 illustrated in FIG. 2 may be similar in some respects to the heat engine system 100 described above and therefore may be best understood with reference to the description of FIG. 1, where like numerals may designate like components and will not be described again in detail.

As illustrated in the embodiment of FIG. 2, a cooling circuit 234 may be fluidly coupled with the working fluid circuit 102 at a first junction or location 238 downstream from the pump 126 and upstream of the recuperator 116 and at a second junction or location 240 downstream from the compressor 152 and upstream of the condenser 120. Accordingly, the working fluid discharged from the pump 126 via line 130 may be split into a first portion and a second portion at the first location 238. The first portion of the working fluid discharged from the pump 126 may flow via line 130 to the recuperator 116 to further cool the working fluid expanded in the turbine 108. The second portion of the working fluid may be directed to the cooling circuit 234 at the first location 238 via line 242 to begin the cooling cycle.

In an exemplary embodiment, the cooling circuit 234 may include an auxiliary condenser 220 downstream from and in fluid communication with the pump 126 via line 242 such that the second portion of the working fluid may be flowed therethrough. As the second portion of the working fluid has an elevated temperature from the pressurization of the working fluid via pump 126, the auxiliary condenser 220 may be configured to condense and cool the second portion of the working fluid with a cooling fluid 258. In an exemplary embodiment, the cooling fluid 258 may be water or air. The auxiliary condenser 220 may be disposed upstream of and in fluid communication with the expansion valve 144 such that the second portion of the working fluid discharged from the auxiliary condenser 220 may be received by the expansion valve 144 via line 244.

Similar to the cooling circuit 134 of FIG. 1, the pressure and temperature of the second portion of the working fluid in the cooling circuit 234 may be reduced in the expansion valve 144 via adiabatic expansion and the flow therethrough may be controlled or metered for entry into the evaporator 146 via line 148. The evaporator 146 may be in fluid communication with the fluid stream 136, such that thermal energy from the fluid stream 136 may be transferred to the second portion of the working fluid, thereby providing a cooled fluid stream 150 exiting the evaporator 146 and vaporizing the second portion of the working fluid. Thus, the second portion of the working fluid provided via the working fluid circuit 102 may be utilized as a refrigerant in the cooling circuit 234 fluidly coupled thereto.

As shown in FIG. 2 and similar to the embodiment of FIG. 1, the cooling circuit 234 may further include the compressor 152 disposed downstream from and in fluid communication with the evaporator 146 via line 154. The compressor 152 may be configured to receive the vaporized second portion of the working fluid discharged from the evaporator 146 and to compress the second portion of the working fluid to a higher pressure, resulting in an increased temperature, such that the compressed second portion of the working fluid may be discharged from the compressor 152 via line 156 and combined with the first portion of the working fluid from line 122 of the working fluid circuit 102 at the second location 240. The combined first portion and second portion of the working fluid may be fed to the condenser 120 via line 124, where the combined first and second portions of the working fluid may be condensed and cooled with the cooling fluid 158. Upon discharge from the condenser 120, the combined working fluid may be fed to the pump 126 via line 128 where the combined first and second portions of the working fluid are pressurized and discharged from the outlet of the pump via line 130. The combined first and second portions of the working fluid may be separated at the first location 238 and the cycles associated with the respective separated first and second portions may be repeated.

In some embodiments, the types of working fluid that may be circulated, flowed, or otherwise utilized in the working fluid circuit 102 of the heat engine system 100, 200 include carbon oxides, hydrocarbons, alcohols, ketones, halogenated hydrocarbons, ammonia, amines, or combinations thereof. Exemplary working fluids that may be utilized in the heat engine system 200 include carbon dioxide, ammonia, methane, ethane, propane, butane, ethylene, propylene, butylene, acetylene, methanol, ethanol, acetone, methyl ethyl ketone, water, derivatives thereof, or mixtures thereof. Halogenated hydrocarbons may include hydrochlorofluorocarbons (HCFCs), hydrofluorocarbons (HFCs) (e.g., 1,1,1,3,3-pentafluoropropane (R245fa)), fluorocarbons, derivatives thereof, or mixtures thereof.

In many embodiments described herein, the working fluid circulated, flowed, or otherwise utilized in the working fluid circuit 102 of the heat engine systems 100, 200, and the other exemplary circuits disclosed herein, may be or may contain carbon dioxide ($CO_2$) and mixtures containing carbon dioxide. Generally, at least a portion of the working fluid circuit 102 contains the working fluid in a supercritical state (e.g., sc-$CO_2$). Carbon dioxide utilized as the working fluid or contained in the working fluid for power generation cycles has many advantages over other compounds typical used as working fluids, since carbon dioxide has the properties of being non-toxic and non-flammable and is also easily available and relatively inexpensive. Due in part to a relatively high working pressure of carbon dioxide, a carbon dioxide system may be much more compact than systems using other working fluids. The high density and volumetric heat capacity of carbon dioxide with respect to other working fluids makes carbon dioxide more "energy dense" meaning that the size of all system components can be considerably reduced without losing performance. It should be noted that use of the terms carbon dioxide ($CO_2$), supercritical carbon dioxide (sc-$CO_2$), or subcritical carbon dioxide (sub-$CO_2$) is not intended to be limited to carbon dioxide of any particular type, source, purity, or grade. For example, industrial grade carbon dioxide may be contained in and/or used as the working fluid without departing from the scope of the disclosure.

In other exemplary embodiments, the working fluid in the working fluid circuit 102 may be a binary, ternary, or other working fluid blend. The working fluid blend or combination can be selected for the unique attributes possessed by the fluid combination within a heat recovery system, as described herein. For example, one such fluid combination includes a liquid absorbent and carbon dioxide mixture enabling the combined fluid to be pumped in a liquid state to high pressure with less energy input than required to compress carbon dioxide. In another exemplary embodiment, the working fluid may be a combination of supercritical carbon dioxide (sc-$CO_2$), subcritical carbon dioxide (sub-$CO_2$), and/or one or more other miscible fluids or chemical compounds. In yet other exemplary embodiments, the working fluid may be a combination of carbon dioxide and propane, or carbon dioxide and ammonia, without departing from the scope of the disclosure.

Figure 3A:
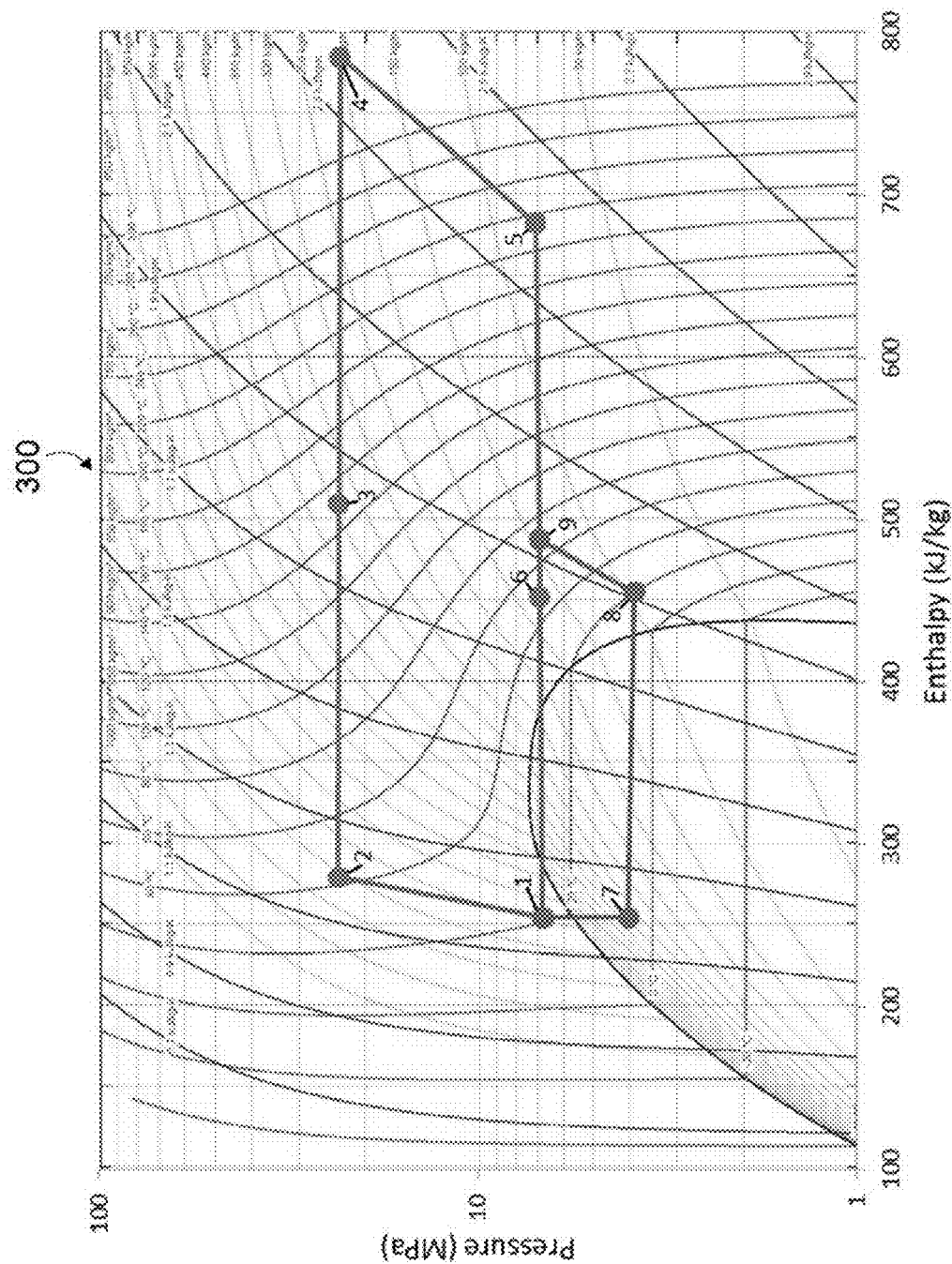
FIG. 3A is a pressure versus enthalpy chart for a thermodynamic cycle produced by an embodiment of the heat engine system of FIG. 1.
Figure 3B:
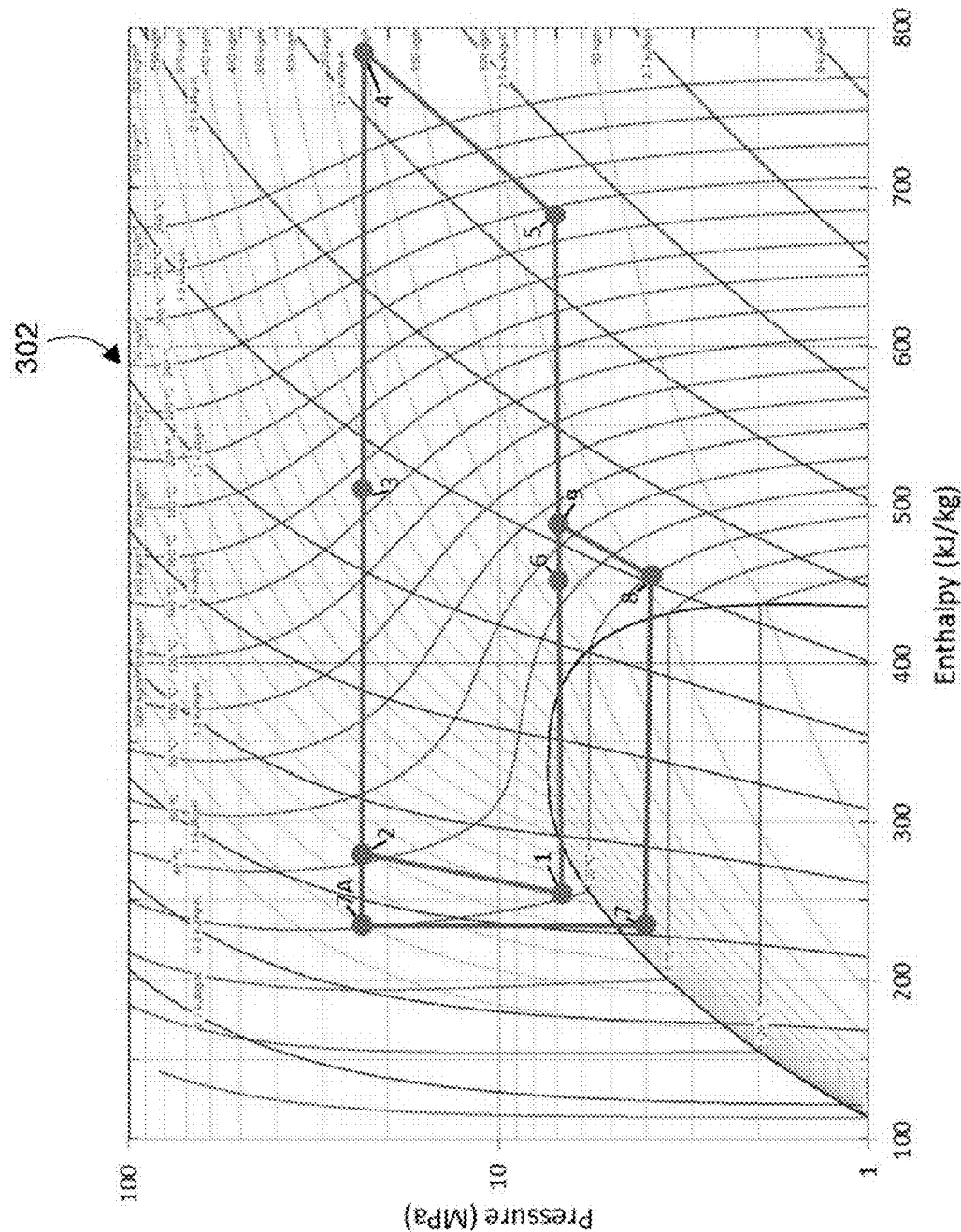
FIG. 3B is a pressure versus enthalpy chart for a thermodynamic cycle produced by an embodiment of the heat engine system of FIG. 2.
Figure 3C:
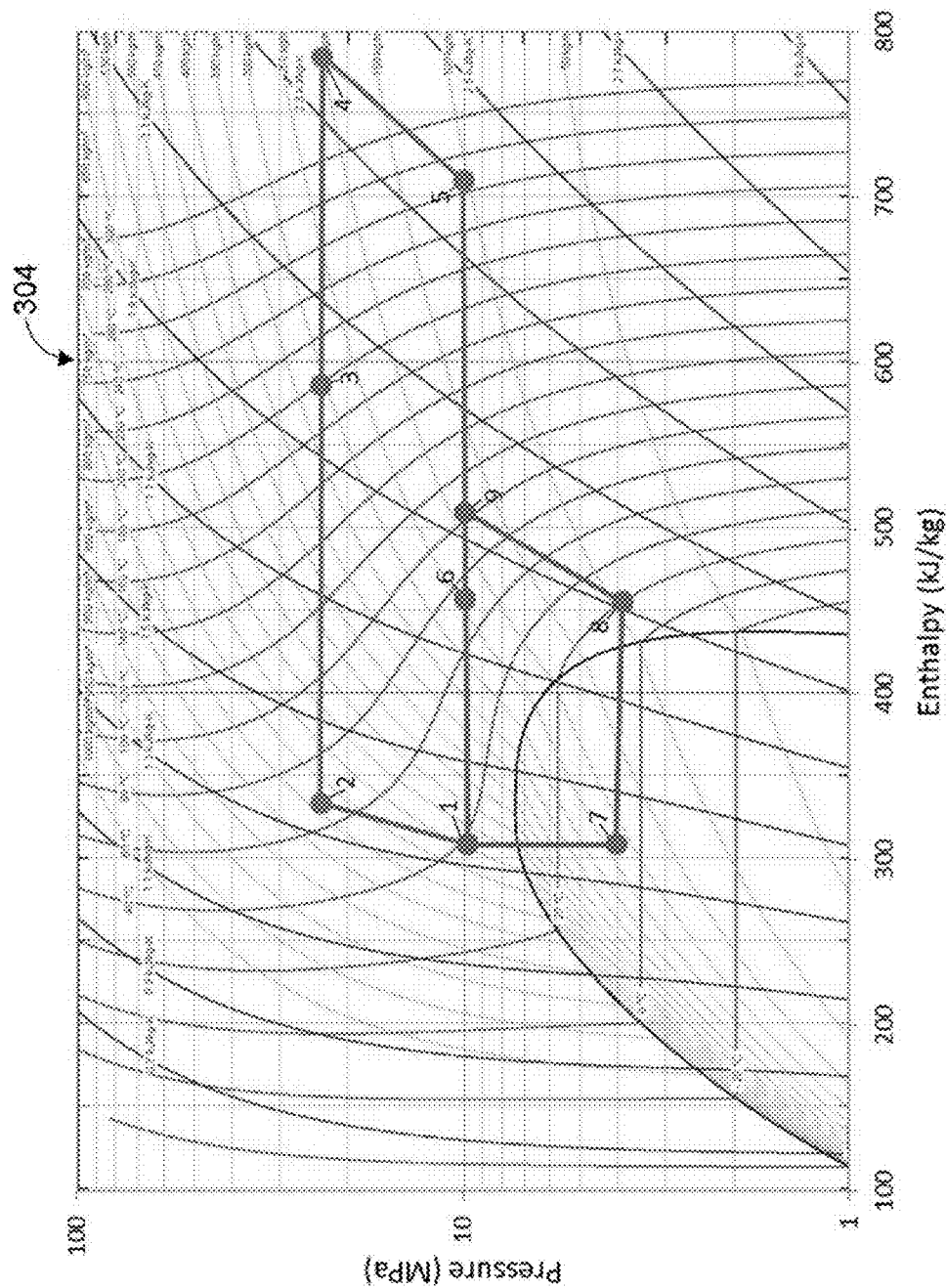
FIG. 3C is a pressure versus enthalpy chart for a thermodynamic cycle produced by an embodiment of the heat engine system of FIG. 1.
Figure 3D:
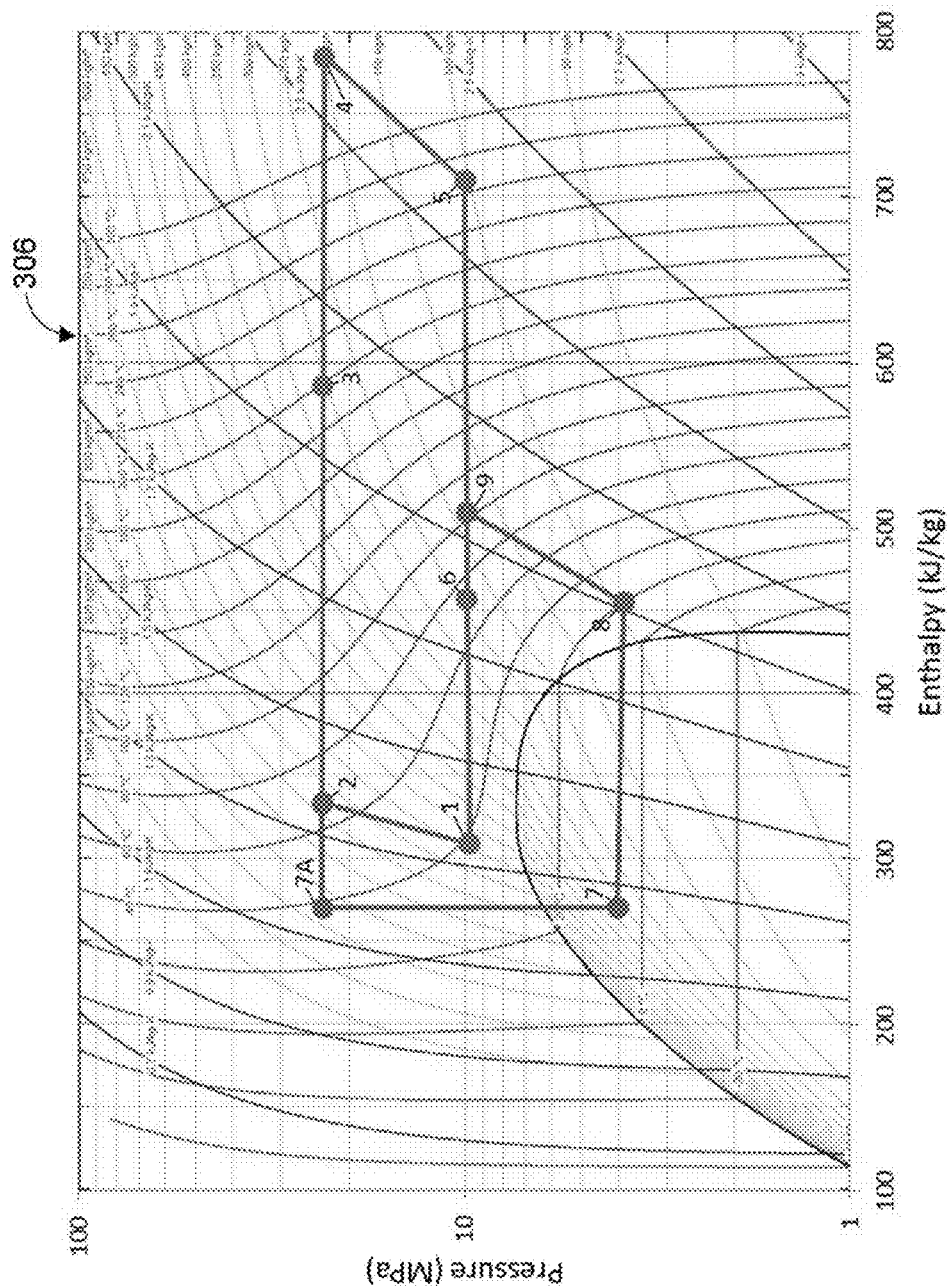
FIG. 3D is a pressure versus enthalpy chart for a thermodynamic cycle produced by an embodiment of the heat engine system of FIG. 2.

FIGS. 3A-3D illustrate pressure versus enthalpy charts for thermodynamic cycles produced by the heat engine systems 100, 200 depicted in FIGS. 1 and 2, respectively, according to one or more embodiments disclosed herein. More specifically, FIG. 3A is a pressure versus enthalpy chart 300 for a thermodynamic cycle produced by the heat engine system 100 at an ambient temperature of 15° C. The state points of FIG. 3A may be correlated to FIG. 1 via reference numbers 1-9 indicative of location points in the heat engine system 100. FIG. 3B is a pressure versus enthalpy chart 300 for a thermodynamic cycle produced by the heat engine system 200 at an ambient temperature of 15° C. The state points of FIG. 3B may be correlated to FIG. 2 via reference numbers 1-9 indicative of location points in the heat engine system 200. FIG. 3C is a pressure versus enthalpy chart 304 for a thermodynamic cycle produced by the heat engine system 100 at an ambient temperature of 37.6° C. The state points of FIG. 3C may be correlated to FIG. 1 via reference numbers 1-9 indicative of location points in the heat engine system 100. FIG. 3D is a pressure versus enthalpy chart 306 for a thermodynamic cycle produced by the heat engine system 200 at an ambient temperature of 37.6° C. The state points of FIG. 3D may be correlated to FIG. 2 via reference numbers 1-9 indicative of location points in the heat engine system 200.

Figure 4:
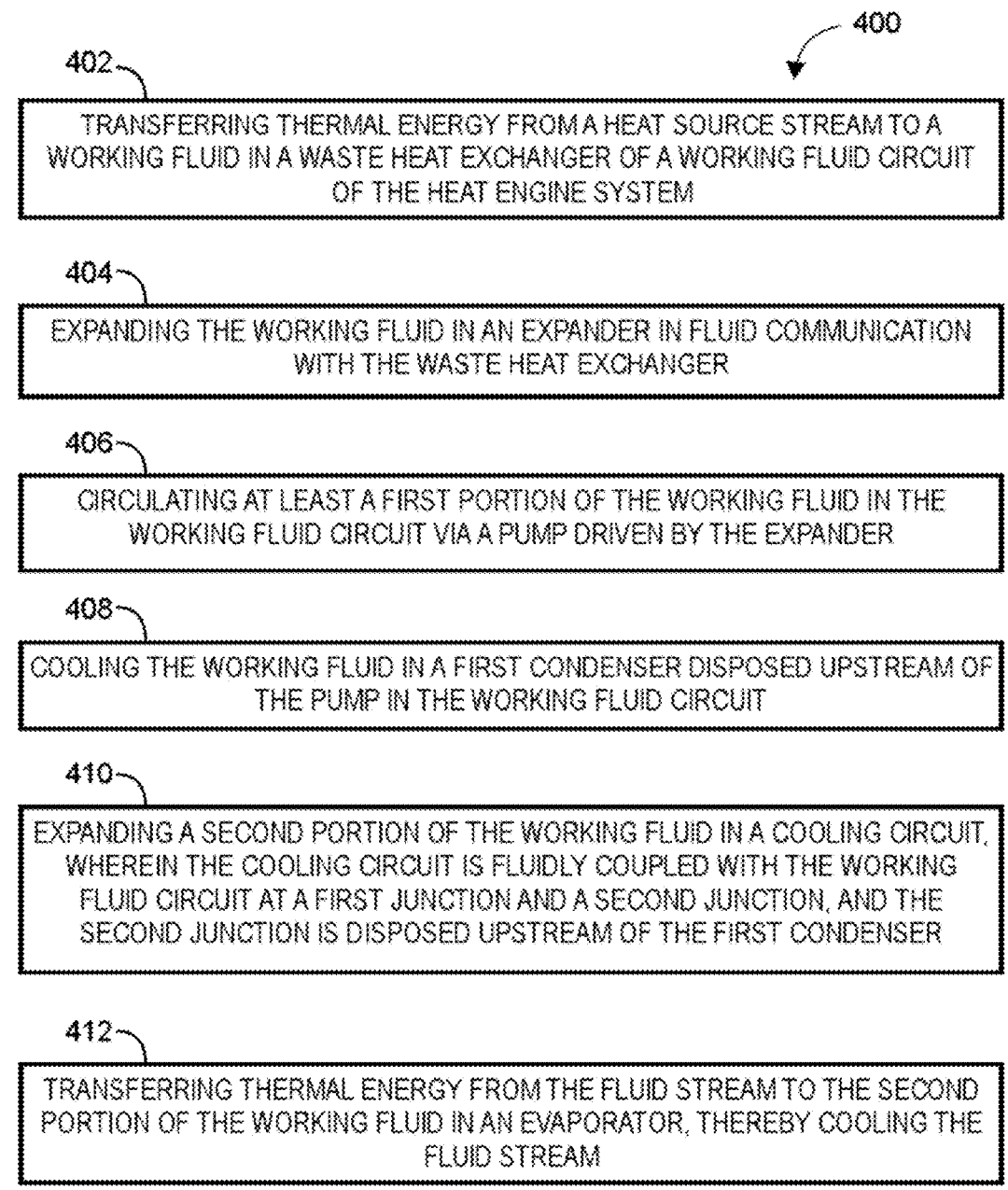
FIG. 4 illustrates a flowchart of an exemplary method for cooling a fluid stream in thermal communication with a heat engine system, according to one or more embodiments disclosed herein.

FIG. 4 illustrates a flowchart of an exemplary method 400 for cooling a fluid stream in thermal communication with a heat engine system, according to one or more embodiments disclosed herein. The method 400 may proceed by operation of either of the heat engine systems 100, 200 and may thus be best understood with reference thereto; however, the method 400 is not limited thereto and may be implemented with other heat engine systems disclosed in U.S. Pat. No. 8,966,901, U.S. Pat. No. 8,869,531, U.S. application Ser. No. 14/475,678, U.S. application Ser. No. 14/475,640, and PCT/US2014/020242, the contents of each of these disclosures are incorporated herein by reference to the extent consistent with the present disclosure.

The method 400 may include transferring thermal energy from a heat source stream to a working fluid in a waste heat exchanger of a working fluid circuit of the heat engine system, as at 402. The method 400 may also include expanding the working fluid in an expander in fluid communication with the waste heat exchanger, as at 404, and circulating at least a first portion of the working fluid in the working fluid circuit via a pump driven by the expander, as at 406. The method 400 may further include cooling the working fluid in a first condenser disposed upstream of the pump in the working fluid circuit, as at 408, and expanding a second portion of the working fluid in a cooling circuit, where the cooling circuit is fluidly coupled with the working fluid circuit at a first junction and a second junction, and the second junction is disposed upstream of the first condenser, as at 410. The method 400 may also include transferring thermal energy from the fluid stream to the second portion of the working fluid in an evaporator, thereby cooling the fluid stream, as at 412.

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

The invention claimed is:

1. A heat engine system, comprising:
    a working fluid circuit configured to flow a working fluid therethrough, comprising:
        a waste heat exchanger configured to be in fluid communication and in thermal communication with a heat source stream, and to transfer thermal energy from the heat source stream to the working fluid;
        an expander disposed downstream from and in fluid communication with the waste heat exchanger and configured to convert a pressure drop in the working fluid to mechanical energy;
        a recuperator disposed upstream of and in fluid communication with the waste heat exchanger and disposed downstream from and in fluid communication with the expander;
        a pump disposed upstream of and in fluid communication with the recuperator and configured to pressurize and circulate at least a first portion of the working fluid within the working fluid circuit; and
        a first condenser disposed upstream of and in fluid communication with the pump and disposed downstream from and in fluid communication with the recuperator; and
    a cooling circuit in fluid communication with the working fluid circuit and configured to flow the working fluid therethrough, the cooling circuit comprising:
        an evaporator in fluid communication with the working fluid circuit and configured to be in fluid communication with a fluid stream, the evaporator further configured to receive a second portion of the working fluid from the working fluid circuit and to transfer thermal energy from the fluid stream to the second portion of the working fluid,
        an expansion valve disposed upstream of and in fluid communication with the evaporator and configured to receive the second portion of the working fluid from the working fluid circuit and to reduce the pressure and temperature of the second portion of the working fluid flowing therethrough,
        a compressor disposed downstream from and in fluid communication with the evaporator and disposed upstream of and in fluid communication with the first condenser, and
        a second condenser disposed downstream from and in fluid communication with the pump and disposed upstream of and in fluid communication with the expansion valve, the second condenser configured to receive and cool the second portion of the working fluid discharged from the pump of the working fluid circuit, wherein
        the cooling circuit is in fluid communication with the working fluid circuit upstream of the first condenser, and the first condenser is configured to receive and flow therethrough the first portion and the second portion of the working fluid, and
        the cooling circuit is in fluid communication with the working fluid circuit at a junction downstream from the pump and upstream of the recuperator, and the recuperator is configured to receive the first portion of the working fluid.

2. The heat engine system of claim 1, further comprising a generator coupled with the expander via a driveshaft, wherein the generator is configured to convert the mechanical energy into electrical energy.

3. The heat engine system of claim 2, wherein the pump is coupled with the expander and the generator via the driveshaft, the expander configured to drive the pump via the driveshaft.

4. The heat engine system of claim 1, wherein the working fluid comprises carbon dioxide in a subcritical state and a supercritical state in different locations of the working fluid circuit and the cooling circuit.

5. A heat engine system comprising:
    a working fluid circuit configured to flow a working fluid therethrough, the working fluid comprising carbon dioxide and the working fluid circuit comprising:
        a waste heat exchanger configured to be in fluid communication and in thermal communication with a heat source stream, and to transfer thermal energy from the heat source stream to the working fluid;
        an expander configured to receive the working fluid from the waste heat exchanger and to convert a pressure drop in the working fluid to mechanical energy;
        a pump configured to pressurize and circulate a least a first portion of the working fluid within the working fluid circuit, the pump further being configured to be driven by the expander via a driveshaft;
        a recuperator configured to receive the working fluid from the expander and the first portion of the working fluid from the pump, and to transfer thermal energy from the working fluid received from the expander to the first portion of the working fluid received from the pump; and
        a first condenser disposed downstream from the recuperator and upstream of the pump; and
    a cooling circuit configured to be in fluid communication with the working fluid circuit and to flow the working fluid therethrough, the cooling circuit comprising:
        an expansion valve configured to receive a second portion of the working fluid from the working fluid circuit and to reduce the pressure and temperature of the second portion of the working fluid flowing therethrough;
        an evaporator configured to be in fluid communication with a fluid stream, the evaporator further configured to receive the second portion of the working fluid from the expansion valve and to transfer thermal energy from the fluid stream to the second portion of the working fluid;
        a compressor configured to receive the second portion of the working fluid from the evaporator and to compress the second portion of the working fluid; and a second condenser configured to receive and cool the second portion of the working fluid from the working fluid circuit, wherein
  the cooling circuit is configured to be in fluid communication with the working fluid circuit at a first junction downstream from the pump and upstream of the recuperator, and
  the cooling circuit is configured to be in fluid communication with the working fluid circuit at a second junction upstream of the first condenser, and the first condenser is configured to receive, cool, and flow therethrough the first portion and the second portion of the working fluid.

6. The heat engine system of claim 5, further comprising a generator coupled with the expander via the driveshaft, wherein the generator is configured to convert the mechanical energy into electrical energy.

7. A method for cooling a fluid stream in thermal communication with a heat engine system, comprising:
  transferring thermal energy from a heat source stream to a working fluid in a waste heat exchanger of a working fluid circuit of the heat engine system;
  expanding the working fluid in an expander in fluid communication with the waste heat exchanger;
  circulating at least a first portion of the working fluid in the working fluid circuit via a pump driven by the expander;
  cooling the working fluid in a first condenser disposed upstream of the pump in the working fluid circuit;
  expanding a second portion of the working fluid in an expansion valve in a cooling circuit, wherein
    the cooling circuit is fluidly coupled with the working fluid circuit at a first junction and a second junction,
    the second junction is disposed upstream of the first condenser, and
    the first junction is downstream from the pump and upstream of a recuperator in fluid communication with the expander, the pump, and the waste heat exchanger;
  transferring thermal energy from the fluid stream to the second portion of the working fluid in an evaporator, thereby cooling the fluid stream;
  compressing the second portion of the working fluid in a compressor disposed downstream from the evaporator in the cooling circuit;
  combining the second portion of the working fluid and the first portion of the working fluid at the second junction; and
  cooling the second portion of the working fluid in a second condenser disposed downstream from and in fluid communication with the pump and disposed upstream of and in fluid communication with the expansion valve.

* * * * *